United States Patent [19]

Turelli et al.

[11] 4,302,657
[45] Nov. 24, 1981

[54] METHOD FOR ARC-WELDING THE BLADES TO THE DISC OR COUNTERDISC OF ROTARY MACHINE ROTORS

[75] Inventors: Federico Turelli; Maurizio Matteini, both of Florence, Italy

[73] Assignee: Nuovo Pignone, S.p.A., Florence, Italy

[21] Appl. No.: 158,866

[22] Filed: Jun. 12, 1980

Related U.S. Application Data

[63] Continuation of Ser. No. 922,306, Jul. 6, 1978, abandoned.

[30] Foreign Application Priority Data

Jan. 12, 1978 [IT] Italy ................................ 19201 A/78

[51] Int. Cl.³ .............................................. B23K 9/225
[52] U.S. Cl. .................................. 219/137 R; 219/127
[58] Field of Search ............................ 219/137 R, 127

[56] References Cited

U.S. PATENT DOCUMENTS

| 2,031,138 | 2/1936 | Taylor | 219/137 R X |
| 3,204,083 | 8/1965 | Fromm | 219/127 |
| 3,209,122 | 9/1965 | Johnston | 219/137 R |
| 3,688,080 | 8/1972 | Cartwright | 219/137 R |

Primary Examiner—Elliot A. Goldberg
Attorney, Agent, or Firm—Morgan, Finnegan, Pine, Foley & Lee

[57] ABSTRACT

For welding rotor blades to a rotor disc of a rotary machine, a welding process is used wherein grooves, called blind slots, are formed through the disc wall thickness but not to the extent to pass through the entire thickness, whereafter the blades are basted by a Tungsten Inert Gas run without added welded material, the blind slots being then filled up by a series of Tungsten Inert Gas welding passes but with added weld material. Headroom limitations are offset and the weld seams come out more robust and with a better surface quality.

1 Claim, 16 Drawing Figures

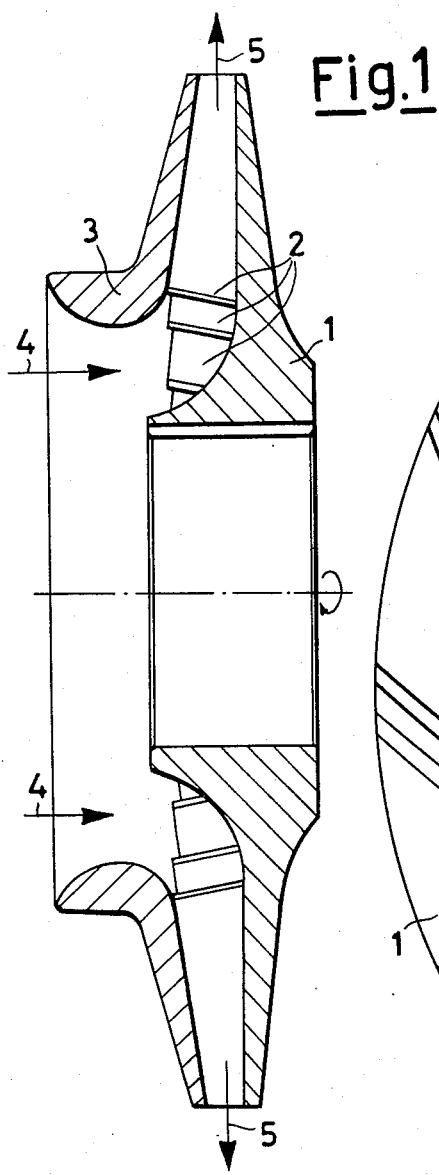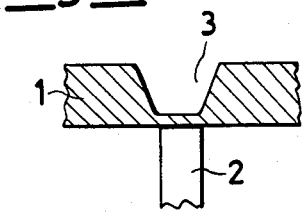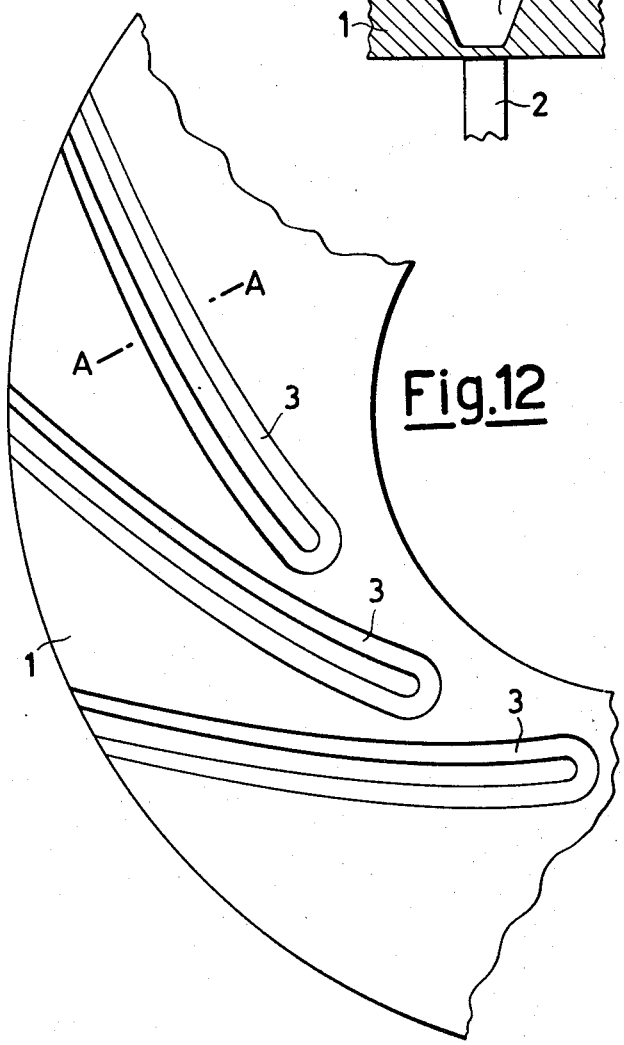

METHOD FOR ARC-WELDING THE BLADES TO THE DISC OR COUNTERDISC OF ROTARY MACHINE ROTORS

This is a continuation, of application Ser. No. 922,306 filed July 6, 1978 now abandoned.

This invention relates to a novel method for the arc-welding of the blades to the disc or counterdisc of rotors, said method being such as to afford a high degree of qualitative reliability to the welded joints between each blade and the rotor disc or counterdisc.

Prior to delving into the welding method which is the subject matter of this invention, the conventional procedure for welding the blades to the disc or the counterdisc of rotors of rotary machines will be briefly scrutinized.

BRIEF DESCRIPTION OF DRAWINGS

FIG. 1 is a cross sectional view of a rotor.

FIG. 12 is a plan view of milled grooves in the rotor.

FIG. 13 is a cross section of one milled groove in a rotor.

FIG. 1 of the accompanying drawings shows a rotor, which is the essential mechanical component part for compressing or thrusting fluids and is basically composed of three assemblies, viz.: the disc 1, a member which transfers to the blades the drive from the coaxial shaft; the blades 2, members which convey the fluid from the intake 4 to the outlet 5 of the rotor; and the counterdisc 3, a member which is not always adopted and is a stiffening component for the edge of the blades which is away from the disc side.

These three assemblies, viz., disc, blades and counterdisc, can be manufactured as an entity, such as in the case of cast or electrically eroded rotors; or in two pieces, in which case the blades are obtained by milling the disc or the counterdisc, the former being separated from the latter; or in three pieces, viz., disc, blades and counterdisc, as obtained discretely by forging and lathe-turning operations.

In the case of two or three discrete pieces, these must appropriately be assembled. The necessity of assembling them is thus nothing but the requirement of permanently conjoining the blades to the disc or the counterdisc.

This junction operation can be performed by two basic procedures:
Riveting procedure,
Welding procedure.

As is known, the arc-welding procedure consists of melting, by the agency of the heat generated by an electric arc, the edges of two metallic pieces placed end-to-end until obtaining an entity.

Figure 2:
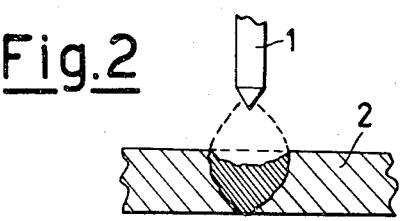
FIGS. 2,3,4,5,6,7 are cross sections views showing arc welding according to the invention.
Figure 2A:
FIGS. 2a, 3a, and 4a show cross sections of the weld formed by arc welding according to this invention.

Arc-welding of the two edges can be carried out without any weld material or with it. In the former case (FIG. 2), the arc is struck between the tip of a cylindrical tungsten electrode 1 which is not used up, and the edges to be welded 2, and the method is called "autogenous electric welding;" a welding seam such as depicted in FIG. 2a is obtained. In the latter case (FIG. 3) the melting of the two edges 2, may be simultaneous with the melting of a third component 3, in the form of a wire or a rod of a material similar or equal to that of the two pieces to be welded, and a welding seam such as depicted in FIG. 3a is obtained.

Figure 4:
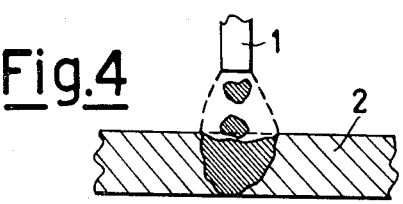
Figure 4A:

In the latter case, the tungsten electrode can be dispensed with and the electric arc can be struck directly between the rod or wire of weld material 1, and the edges to be welded 2, as seen in FIG. 4 and the corresponding welding seam is shown in FIG. 4a.

In order to shield the molten metal from pollution by air and to prevent the resultant serious welding defects, resort is had, as is known, to two methods:

(a) Shielding with slags floating on the molten bath
(b) Shielding by an inert gas which sweeps the molten bath.

Figure 5:
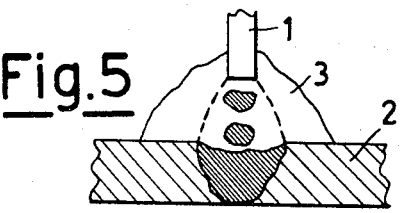
Figure 6:
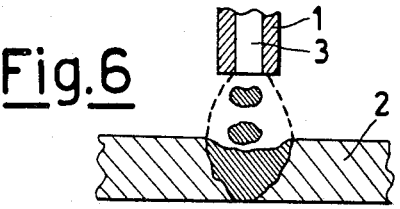
Figure 7:
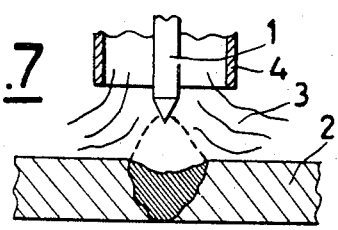

The slag may come from the melting of a mineral powder 3 called a flux and generously poured on the arc (FIG. 5), or from the melting of a mineral coating 3 which wraps the rod 1 of weld material (coated electrode) as shown in FIG. 6. The inert gas is supplied through a nozzle 4 which is placed around the tungsten electrode 1 and at a distance therefrom coaxially as shown in FIG. 7.

The welding method for securing the blades to the disc or counterdisc of rotors of rotary machines according to the present invention adopts the arc-welding method with tungsten electrode without weld material and with inert-gas shield (FIG. 7), commonly called T.I.G., i.e. Tungsten-Inert Gas.

No discussion will be given of the riveting procedure since the welding procedure has now made it largely obsolete, and the present invention is directed just to the welding procedure.

Figure 8:
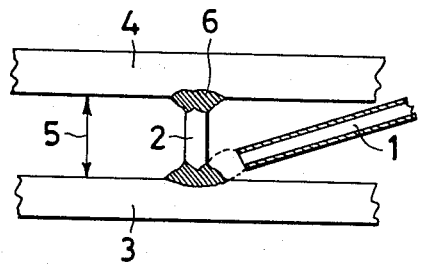
FIGS. 8 and 9 shows the prior art method of welding rotors.
Figure 9:
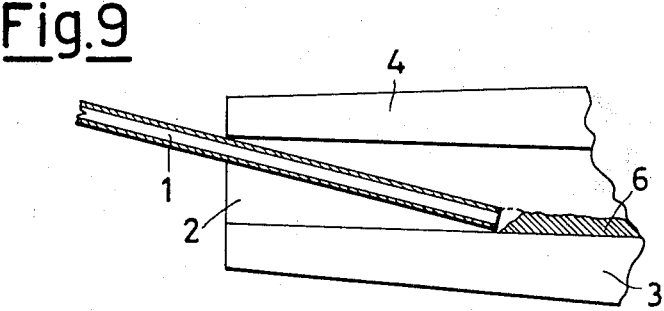

According to the prior art (FIGS. 8 and 9), the blades 2 of rotors having a height 5 (between the disc and the counterdisc) which exceeds a minimum value, are welded to the disc 3 (or the counterdisc 4) by introducing the wire with the flux or the coated electrode 1 within the interstices between the blades and between the disc and the counterdisc. The minimum height limit is due to the necessity of readily accessing with the wire of the coated electrode all the points of contact between the blade edges and the disc, or the counterdisc. If the height of a blade is shorter than the minimum referred to above, the rotor is usually fabricated with technological procedures other than welding.

The generalized internal welding outlined above has, however, a few shortcomings:

This method cannot be applied below the minimum height referred to above,
when applied manually, the method produces welding seams 6 (FIGS. 8 and 9) which have an irregular outline and, very often, are such as to require a finishing procedure for the surfaces by means of metallic or ceramic grinding wheels,
the manual performance of the method, on account of the numerous variables involved in the method, such as current intensity, voltage between the coated electrode and the edges to be welded, welding speed, positioning of the coated electrode end relative to the edges, is not such as to ensure a constancy of manufacture and results and thus a certain and permanent exemption from defects.

The method of arc-welding of blades to the disc (or counterdisc) according to the present invention does away with the drawbacks enumerated above and, with reference to FIGS. 10, 11, 12 and 13 of the accompanying drawings, has the following characteristic features:

Welding of the blades 2 takes place from the outside of the rotor, through the disc or the counterdisc, which, to this purpose, has grooves 3, as obtained by machining exactly by milling (FIG. 12).

Figure 10:
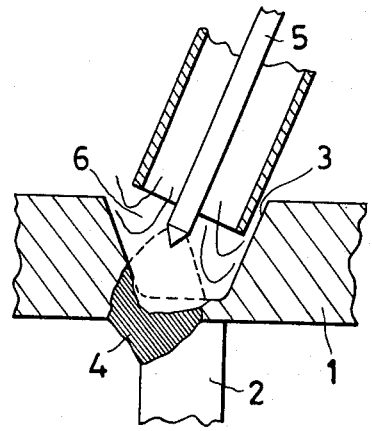
FIG. 10 is a cross section view showing welding a disc to a blade from the outside.
Figure 11:
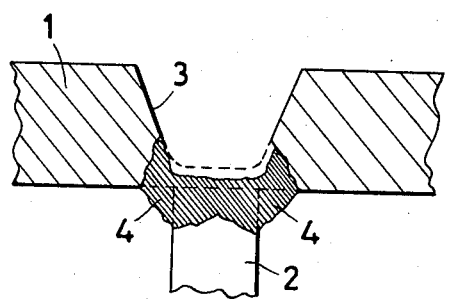
FIG. 11 is a cross section view showing the first pass weld resulting from the method of FIG. 10.

For the first passes 4, for anchoring the blades to the disc or the counterdisc, a tungsten electrode 5, without weld material coated thereon and under an inert gas blanket 6 (TIG method) is used, since the excess material is required to form the anchoring corner seams as supplied by the bottom surface of the grooves 3 formed through the disc or the counterdisc, which do not pass completely through the disc or counterdisc wall thickness and are thus called "blind slots" (FIGS. 10 and 11).

Figure 3:
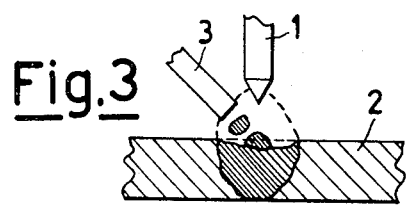
Figure 3A:

In the subsequent fill-up passes of the blind slots, the same TIG method as before is used, but with added weld material as shown in FIG. 3.

The TIG method employed in the initial anchoring passes and in the subsequent blind slot filling passes is automatized in the sense that electric current, voltage, welding speed and position of the tungsten electrode tip are maintained constant along the entire slot length.

FIG. 13 shows a cross-sectional view along the line A—A of the milled groove 3 indicated in plan view in FIG. 12, whereas FIGS. 10 and 11 show the manner in which one of the two anchoring (basting) passes is performed and the outline of the welded area with the two completed basting passes.

The advantages afforded by this novel method for welding rotor blades of rotary machines can be summarized as follows:

the performance of the welding operations from the outside of the disc or the counterdisc, which is always easily accessible, does away with the headroom limitation indicated above and permits the welding operation to be carried out also in headroom fields which were, previously, an exclusive pertinence of other technological procedures such as casting and electro-erosion.

The casting procedure is capable of ensuring reduced initial costs only if the number of rotors to be produced with the same pattern is such as to reduce the incidence of the high cost of the pattern on the individual as-produced workpiece.

However, the rotors, due to reasons of design, vary widely as to kind and size; the result is that storage of numerous patterns become necessary and the incidence on the subsequent costs per produced item becomes serious if the production does not attain a high output rating.

In addition to the production costs as outlined above, the quality factor of the product must be considered, bearing in mind that the cast product is much less satisfactory than the welded one under the high performance standards which are presently required of the rotors.

On the other hand, the electro-erosion procedure has considerably high first costs per each produced item if compared with the analogous costs of the welding procedure, whereas the quality level of the product is not certainly higher than the level which is afforded by the method according to the present invention.

The welding method of the present invention permits preparation of even basting welding seams which are regular and flawless, with such a degree of surface smoothness as not to require any additional manual honing operation on the surfaces which are exposed to the working fluid stream.

Evenness and regularity of performance are ensured by the constancy of the welding parameters used, such constancy being warranted, in its turn, by an assembly of working implements such as rotary positioning contrivances, current generators, and command and control automatized appliances having a high degree of reliability.

The absence of defects is ensured, lastly, by a study and a preliminary test work which are directed to the definition of the magnitudes of the welding parameters which are best adapted to the kind of rotor, its size and the material of which it is made, so as to adopt the best process run in practice.

We claim:

1. A method of arc-welding a blade to the disc or counterdisc of a rotor, comprising:

providing on the disc or counterdisc, on the side opposite that to which the blade is to be welded, a groove of length substantially equal to the length of the blade, said groove being located in a position opposite the position at which the blade is to be welded, and having a bottom wall, the depth of which is less than the thickness of said disc or counterdisc;

positioning the blade in abutting relationship with said disc or counterdisc on the side and at a position opposite said groove;

basting said blade to the bottom wall of said groove of said disc or counterdisc by performing inner welding from the outside without going through said bottom wall by subjecting said groove in generally longitudinal passes to the heat of a tungsten electrode under an inert gas blanket using the TIG arc-welding method without added weld material to form corner basting seams substantially from the material of said bottom wall, to thereby anchor said blade thereto; and filling the groove by longitudinal passes of the tungsten electrode using the TIG arc-welding method with added weld material;

the current, voltage, welding speed, and positioning of the electrode being kept constant along the length of the groove during both the basting and filling passes.

* * * * *